(12) United States Patent
Shichijyo

(10) Patent No.: US 6,958,557 B2
(45) Date of Patent: Oct. 25, 2005

(54) VEHICLE AC GENERATOR

(75) Inventor: Akiya Shichijyo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/101,876

(22) Filed: Mar. 21, 2002

(65) Prior Publication Data

US 2002/0140300 A1 Oct. 3, 2002

(30) Foreign Application Priority Data

Mar. 29, 2001 (JP) ............................. 2001-096915

(51) Int. Cl.$^7$ ............................................. H02K 11/00
(52) U.S. Cl. ..................................... 310/68 D; 310/64
(58) Field of Search ........................... 310/680, 64, 89

(56) References Cited

U.S. PATENT DOCUMENTS

| | | | |
|---|---|---|---|
| 3,927,336 A | 12/1975 | Vjeilleribiere | |
| 4,419,597 A | 12/1983 | Shiga et al. | |
| 4,720,645 A | 1/1988 | Stroud | |
| 4,952,829 A | 8/1990 | Armbruster et al. | |
| 5,296,778 A | 3/1994 | Stroud | |
| 5,949,166 A | 9/1999 | Ooiwa et al. | |
| 6,034,452 A | 3/2000 | Nakamura et al. | |
| 6,060,802 A | 5/2000 | Masegi et al. | |
| 6,121,699 A | 9/2000 | Kashihara et al. | |
| 6,198,188 B1 | 3/2001 | Ihata | |
| 6,580,187 B2 * | 6/2003 | Bradfield | 310/64 |
| 2002/0047359 A1 * | 4/2002 | Seo | 310/68 D |
| 2002/0060502 A1 * | 5/2002 | Irie | 310/68 D |
| 2002/0079757 A1 * | 6/2002 | Bradfield | 310/68 D |

FOREIGN PATENT DOCUMENTS

| | | |
|---|---|---|
| JP | A 56-45062 | 4/1981 |
| JP | A 59-108340 | 6/1984 |
| JP | A 1-157252 | 6/1989 |

* cited by examiner

Primary Examiner—Thanh Lam
(74) Attorney, Agent, or Firm—Oliff & Berridge, PLC

(57) ABSTRACT

In a rectifying device of a vehicle ac generator, a positive-side radiating fin and a negative-side radiating fin are arranged to oppose each other in an axial direction and a terminal board is interposed therebetween. One of the fins, which is directly fixed to a frame, is substantially in an arc shape having a circular arc angle of equal to or more than 180 degrees and separated into two partial radiating fins at a substantially middle part in a circumferential direction. Each of the partial radiating fins has two fixing portions near its radially outer end. Screws are inserted into the fixing portions and tightened to threaded holes provided in the frame to fasten the rectifying device to the frame. Instead of separating the fin into the partial radiating fins, a groove is provided on a surface of the fin.

20 Claims, 5 Drawing Sheets

VEHICLE AC GENERATOR

CROSS REFERENCE TO RELATED APPLICATION

This application is based on Japanese Patent Application No. 2001-96915 filed on Mar. 29, 2001, the disclosure of which is incorporated herein by reference.

FIELD OF THE INVENTION

The present invention relates to a vehicle ac generator mounted on a passenger car, an auto truck and the like.

BACKGROUND OF THE INVENTION

In a rectifying device of a vehicle ac generator disclosed in JP-A-2000-253625 (U.S. Pat. No. 6,198,188), a positive-side radiating fin and a negative-side radiating fin are stacked in an axial direction and a terminal board having connecting terminals is interposed therebetween. Positive-side diodes and negative-side diodes are press-fitted and soldered in through holes provided in both of the radiating fins in the axial direction. The negative-side radiating fin is directly fixed to the outer end surface of a housing with screws and grounded.

When the negative-side radiating fin is fixed to the housing, the negative-side radiating fin is likely to be deformed due to steps on fixing surfaces of the negative-side radiating fin and the housing. As a result, the through holes for fixing the negative-side diodes are deformed and a soldering as a jointing material causes cracks.

In a rectifying device disclosed in JP-A-56-45062, a positive-side radiating fin and a negative-side radiating fin are arranged in one plane surface with a predetermined space. The negative-side radiating fin is directly fixed to the inner wall of a housing forming the outer case of a vehicle ac generator. In this rectifying device, water and the like entering the vehicle ac generator are likely to accumulate and cause corrosion and the like therein.

SUMMARY OF THE INVENTION

The present invention is made in view of the above problems, and it is an object to provide a vehicle ac generator which can decrease deformation of a heat radiating fin fixed to a frame. It is another object to provide a vehicle ac generator in which water and the like are not easily accumulated near the heat radiating fin.

In a vehicle ac generator, a rectifying device that converts ac voltage generated in a stator coil by rotation of a rotor into dc voltage has a heat radiating fin and a terminal board. A plurality of diodes is fixed to the heat radiating fin. The terminal board embeds connecting terminals connecting the plurality of diodes. The heat radiating fin has a plurality of fixing portions to be fixed to a frame and a groove between two of the plurality of fixing portions.

For instance, the heat radiating fin is separated into a plurality of partial radiating fins and the groove is defined between the partial radiating fins. Alternatively, the groove is provided on a surface of the heat radiating fin.

Since the groove is provided between the plurality of fixing portions of the heat radiating fin, when the heat radiating fin is fixed to the frame, excessive stress caused by steps on fixing surfaces of the frame and the heat radiating fin is eased by the groove. Accordingly, deformation of the heat radiating fin is decreased. Further, the groove functions as a drain for discharging water and the like entering near the rectifying device. Therefore, corrosion due to accumulated water and the like is suppressed.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

A vehicle ac generator according to the preferred embodiments of the present invention is described hereinafter with reference to drawings.

(First Embodiment)

Figure 1:
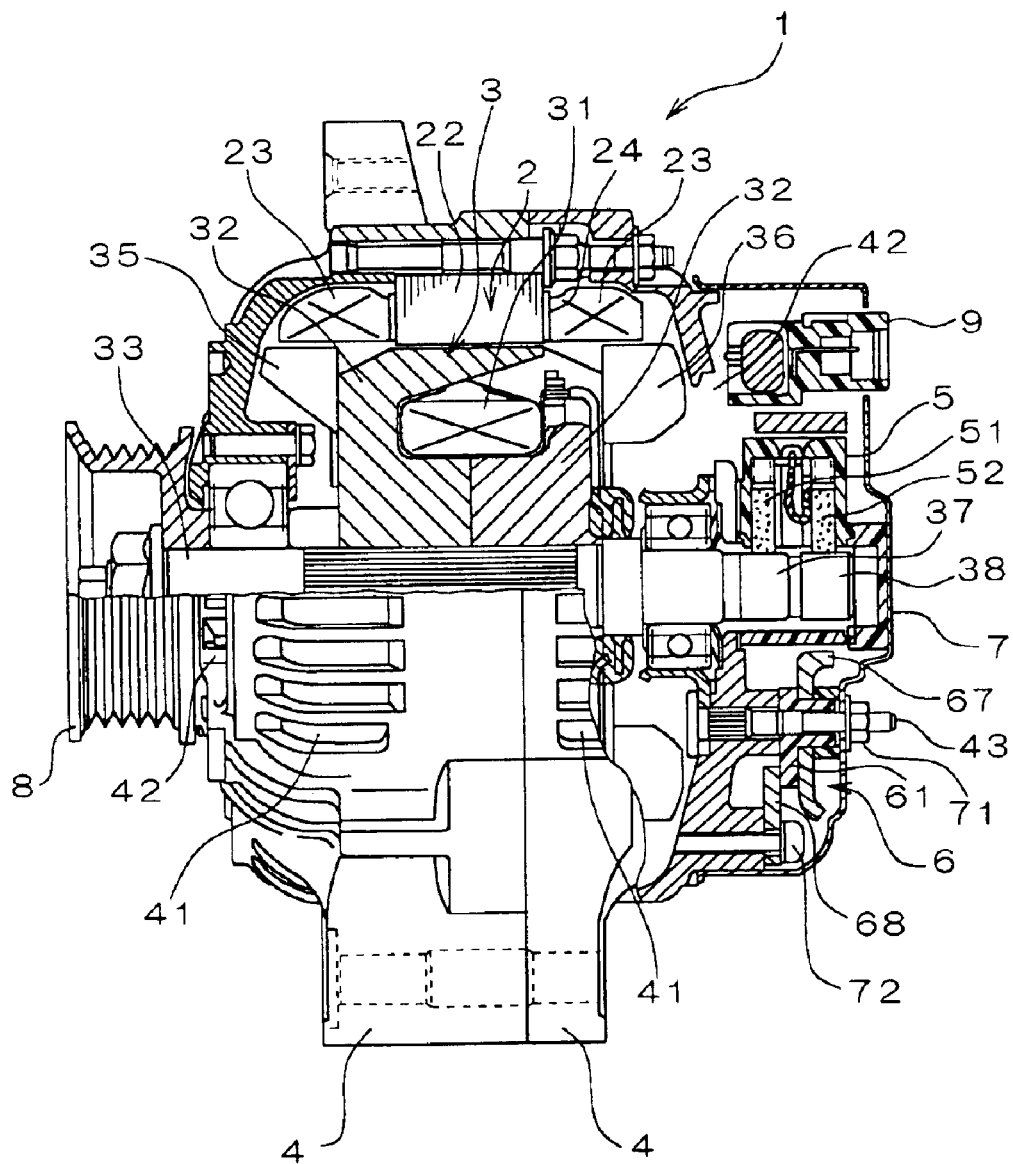
FIG. 1 is a schematic view of a vehicle ac generator according to a first embodiment of the present invention.

Referring to FIG. 1, a vehicle ac generator 1 has a stator 2, a rotor 3, frames 4, a brush device 5, a rectifying device 6, a rear cover 7, an IC regulator 9 and the like.

The stator 2 has a stator core 22, three-phase stator coils 23, and insulators 24 for electrically insulating between the stator core 22 and the stator coils 23. The rotor 3 has a field coil 31, pole cores 32, and a rotor shaft 33. The field coil 31 is wound about the pole cores 32 by cylindrically and concentrically winding an insulated copper wire. Each of the pole cores 32 has six claw poles. The rotor shaft 33 supports the pole cores 32 and the field coil 31 is sandwiched between the pole cores 32. A cooling fan 35 is fixed to an axial end surface of the front side pole core 32 (left side in FIG. 1) by welding or the like. The cooling fan 35 draws cooling air from a front side and discharges it in an axial direction and a radial direction. Similarly, a cooling fan 36 is fixed to an axial end surface of the rear side pole core 32 (right side in FIG. 1) by welding or the like. The cooling fan 36 draws cooling air from a rear side and discharges it in the radial direction. A pair of slip rings 37 and 38 are mounted on the substantially rear end of the rotor shaft 33 and electrically connected to both ends of the field coil 31. Electric power is supplied from the brush device 5 to the field coil 31 through the pair of slip rings 37 and 38.

The frames 4 accommodate the stator 2 and the rotor 3 therein. The rotor 3 is rotatably supported around the rotor shaft 33. The stator core 2 is arranged to face the outer periphery of the pole cores 32 with a predetermined clearance and fixed to the inner periphery of the frames 4. The frames 4 have cooling air discharge windows 41 at parts corresponding to the stator coil 23 that protrudes from the axial end surfaces of the stator core 22 in the axial direction and air intake windows 42 on the axial end surfaces.

The brush device 5 guides exciting current from the rectifying device 6 to the field coil 31 of the rotor 3. The brush device 5 has brushes 51 and 52 that are respectively pressed to the slip rings 37 and 38 on the rotor shaft 33 of the rotor 3. The rectifying device 6 converts three-phase ac voltages generated in the three-phase stator coils 23 into dc output power.

The rear cover 7 covers and protects electrical components, such as the brush device 5, the rectifying device 6 and the IC regulator 9 mounted outside the rear side frame 4. Bolts 43 are provided on the rear side frame 4 to protrude in the axial direction, so the rear cover 7 is fastened to the frame 4 by tightening metallic nuts 71 onto the bolts 43. The rectifying device 6 is sandwiched between the rear side frame 4 and the rear cover 7. The rear cover 7 has a plurality of air intake windows on a surface corresponding to the rectifying device 6. Cooling air is drawn into the inside of the rear cover 7 through the air intake windows.

When rotation force is transmitted from an engine (not shown) to a pulley 8 through belts and the like, the rotor 3 rotates in a predetermined direction. In this state, when exciting current is supplied to the field coil 31 of the rotor 3, the claw poles of the pole cores 32 are excited so that three-phase ac voltages are generated in the stator coils 23. Accordingly, dc current of a predetermined magnitude is output from an output terminal provided in the rectifying device 6.

Figure 2:
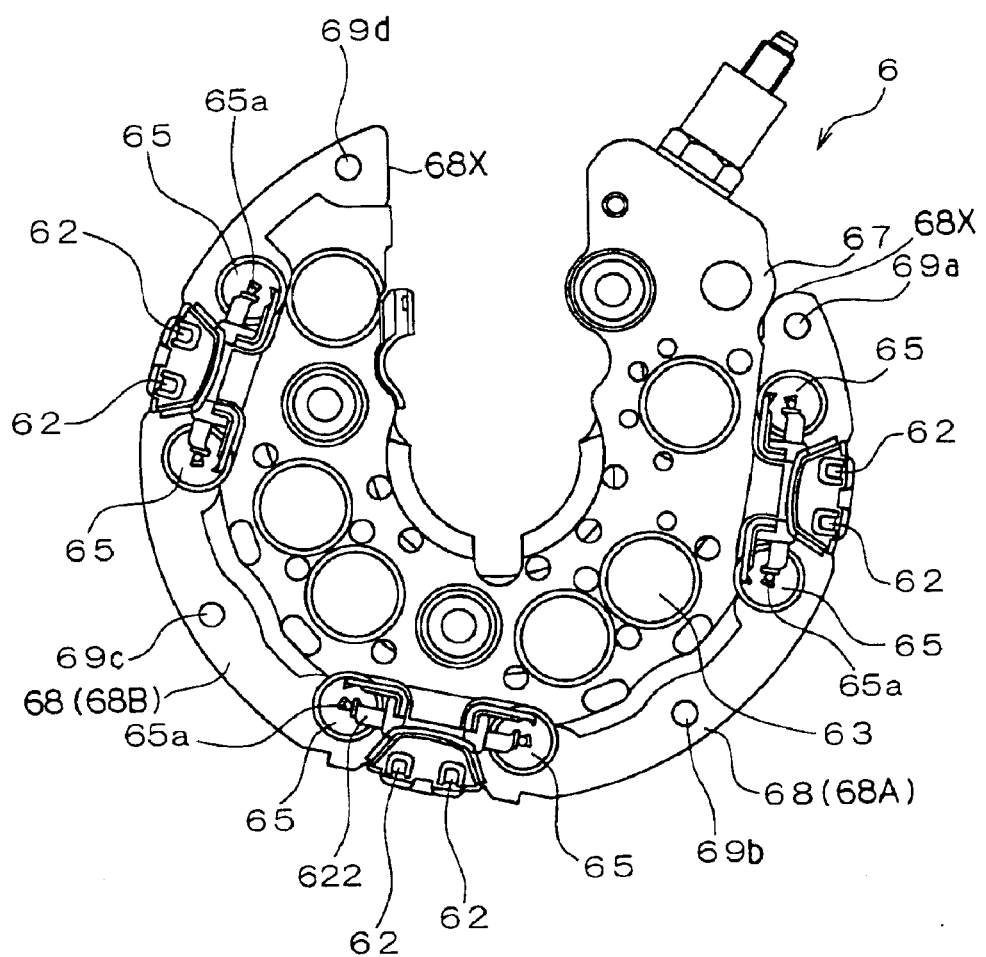
FIG. 2 is a plan view of a rectifying device viewed from a rear side of the generator shown in FIG. 1.
Figure 3:
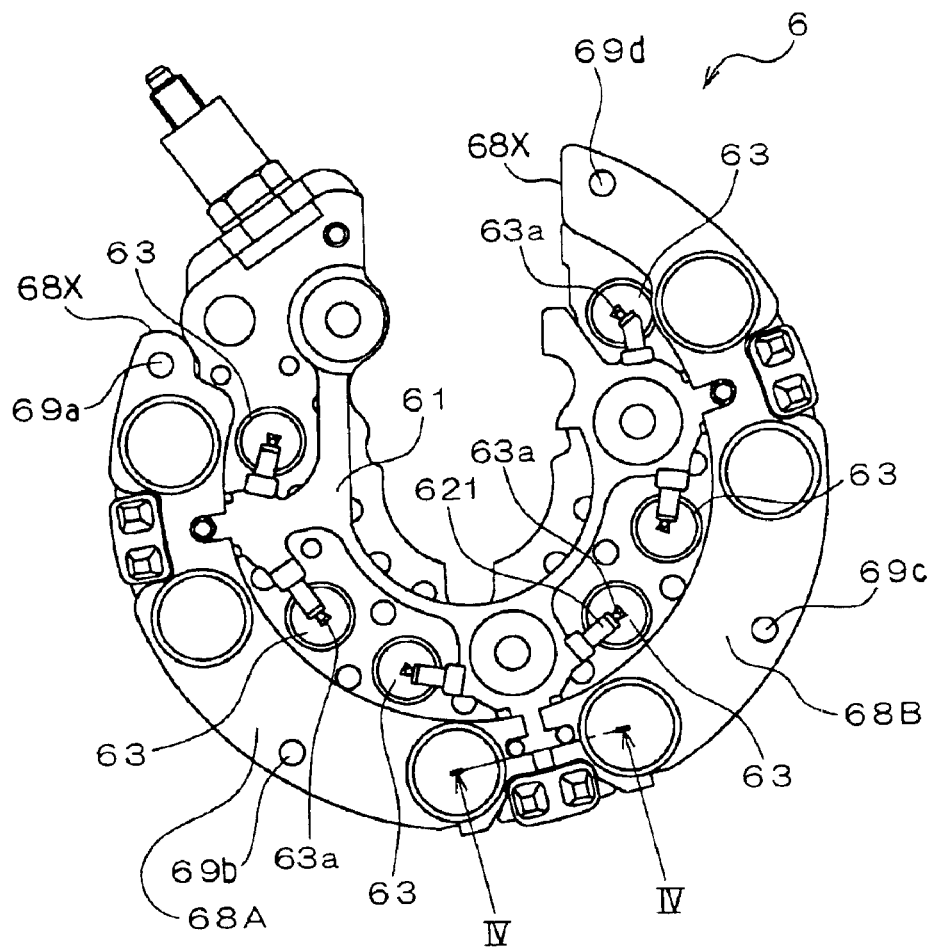
FIG. 3 is a plan view of the rectifying device viewed from a frame side of the generator shown in FIG. 1.
Figure 4:
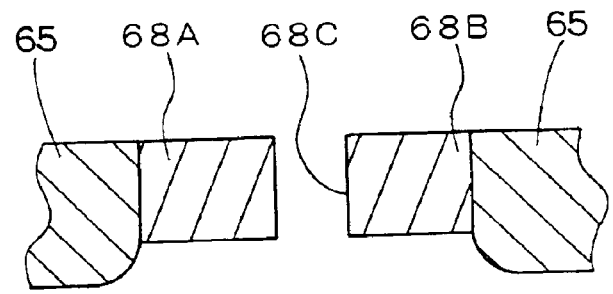
FIG. 4 is an enlarged cross-sectional view of a negative-side radiating fin taken along line IV—IV in FIG. 3.

The rectifying device 6 has a positive-side radiating fin 67, a negative-side radiating fin 68 and a terminal board 61, as shown in FIGS. 2 and 3. The positive-side radiating fin 67 and the negative-side radiating fin 68 are arranged to interpose the terminal board 61 therebetween and oppose each other in the axial direction with a spacing therebetween. Six positive side diodes 63 are press-fitted in the axial direction in through holes provided on the positive-side radiating fin 67 as fixing holes. Leads 63a of the positive-side diodes 63 are directed to the frame 4 side, and jointed to connecting terminals 62 protruding from the terminal board 61 at junctions 621 by TIG welding. Six negative-side diodes 65 are press-fitted in the axial direction in through holes provided on the negative-side radiating fin 68 as fixing holes. Leads 65a of the negative-side diodes 65 are directed to the rear side, and jointed to the connecting terminals 62 protruding from the terminal board 61 at junctions 622 by TIG welding.

The negative-side radiating fin 68 is substantially in an arc shape having a circular arc angle of equal to or more than 180 degrees, as shown in FIG. 3. Thus, the negative-side radiating fin 68 has a pair of circumferential ends 68X defining a spacing therebetween. The negative-side radiating fin 68 is separated into at least two partial radiating fins 68A and 68B at a substantially middle part in the circumferential direction thereof, and defines a groove 68C between the partial radiating fins 68A and 68B substantially at the lower-most position of the fin 68. Thus, the groove 68C is provided at a position, which is generally opposite in the radial direction to the spacing defined by the circumferential ends 68X. Each of the partial radiating fins 68A and 68B has two fixing portions 69a and 69b, and 69c and 69d near its radially outer end. The fixing portions 69a to 69d have through holes. Screws 72 are inserted through the fixing portions 69a to 69d and tightened to threaded holes provided in the frame 4, so the rectifying device 6 is fixed to the frame 4, as shown in FIG. 1.

When the screws 72 are tightened to the frame 4 through the fixing portions 69a to 69d, if steps or gaps exist on or between fixing surfaces of the negative-side radiating fin 68 and the frame 4, stress is applied onto the fin 68. However, since the groove 68C is provided between the fixing portions 69b and 69c, excessive stress caused by the steps or gaps on the negative-side radiating fin 68 and the frames 4 can be reduced. Accordingly, deformation of the negative-side radiating fin 68 is decreased. Further, water and the like entering near the negative-side radiating fin 68 can be discharged through the groove 68C defined at the lower-most position. As a result, corrosion due to accumulated water and the like is decreased.

Further, since the deformation of the negative-side radiating fin 68 is decreased, it is restricted that fixing force of the negative-side diodes 65 press-fitted in the through holes changes due to use condition of the vehicle ac generator 1. Therefore, the negative-side diodes 65 are properly fixed by press-fitting. A complicated manufacturing process such as soldering is changed to a simple connection, thereby decreasing a manufacturing cost.

Since the groove 68C is defined between the substantially middle part of the negative-side radiating fin 68 in the circumferential direction, both of the partial radiating fins 68A and 68B have the substantially same area. Accordingly, the negative-side diodes 65 are equally cooled, thereby increasing durability and the cooling capacity of the negative-side diodes 65.

(Second Embodiment)

Figure 5:
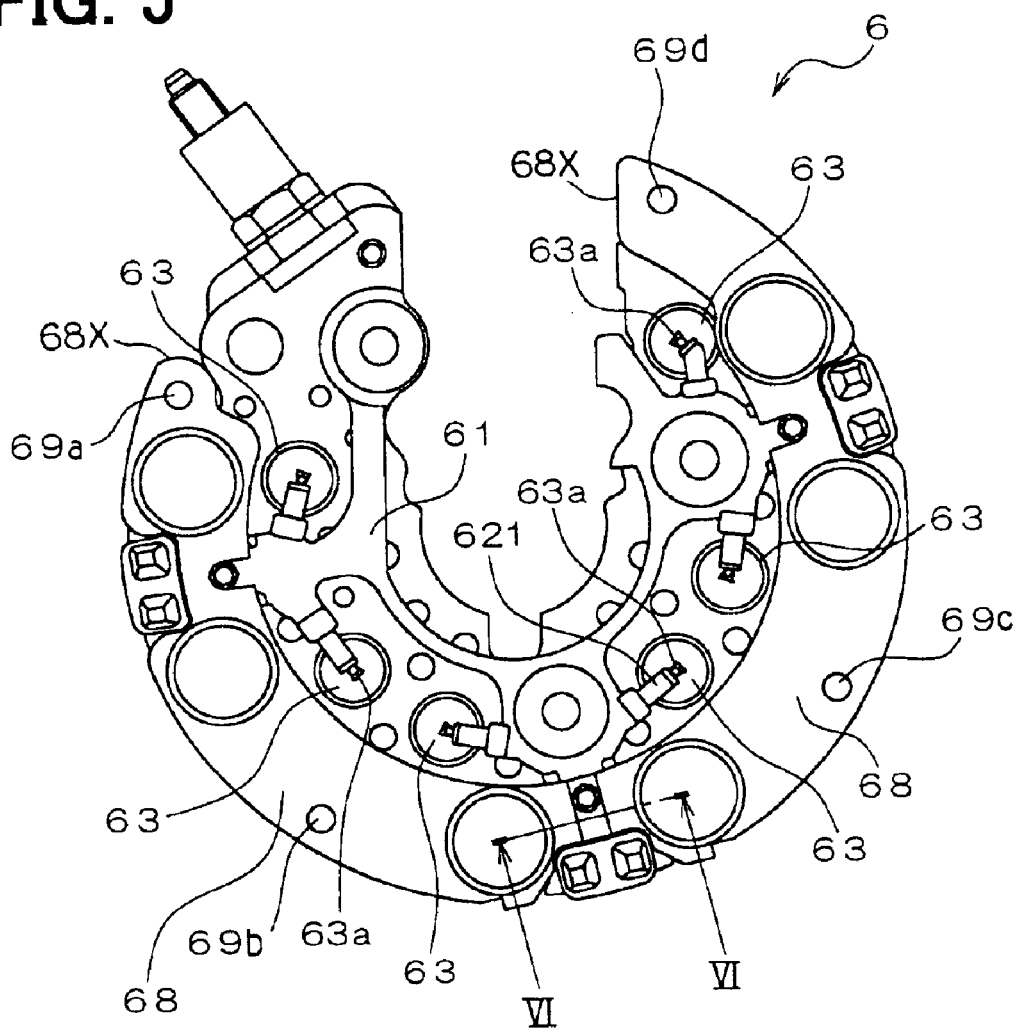
FIG. 5 is a plan view of a rectifying device of a vehicle ac generator according to a second embodiment of the present invention.
Figure 6:
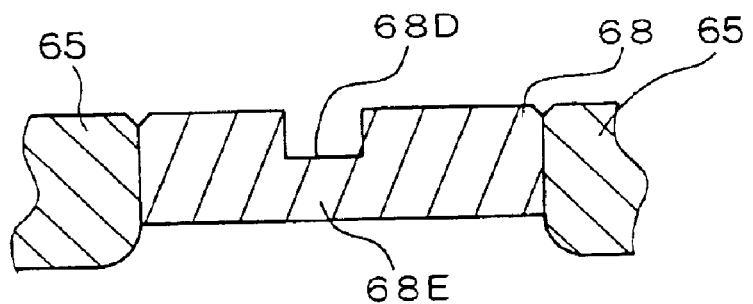
FIG. 6 is an enlarged cross-sectional view of a negative-side radiating fin taken along line VI—VI in FIG. 5.

In the second embodiment shown in FIGS. 5 and 6, the negative-side radiating fin 68 has a groove 68D on its surface of the frame 4 side, in place of the groove 68C provided by separating the fin 68 into the partial radiating fins 68A and 68B.

Preferably, the groove 68D is provided at a substantially middle part of the negative-side radiating fin 68 in the circumferential direction and substantially at the lower-most position of the fin 68. In this case, a part of the negative-side radiating fin 68 where a thickness is reduced by forming the groove 68D becomes a thin wall portion 68E. This arrangement reduces excessive stress caused by the steps or the gaps on the negative-side radiating fin 68 and the frame 4 when the screws 72 are tightened to the frame 4 through the fixing portions 69. Accordingly, deformation of the negative-side radiating fin 68 is decreased. Since the groove 68D is formed on the surface of the negative-side radiating fin 68, not only the manufacturing process is simplified, but also the groove 68D functions as a drain for water and the like. Therefore, water and the like entering near the negative-side radiating fin 68 can be discharged through the groove 68D at the lower-most position of the rectifying device 6.

(Third Embodiment)

Figure 7:
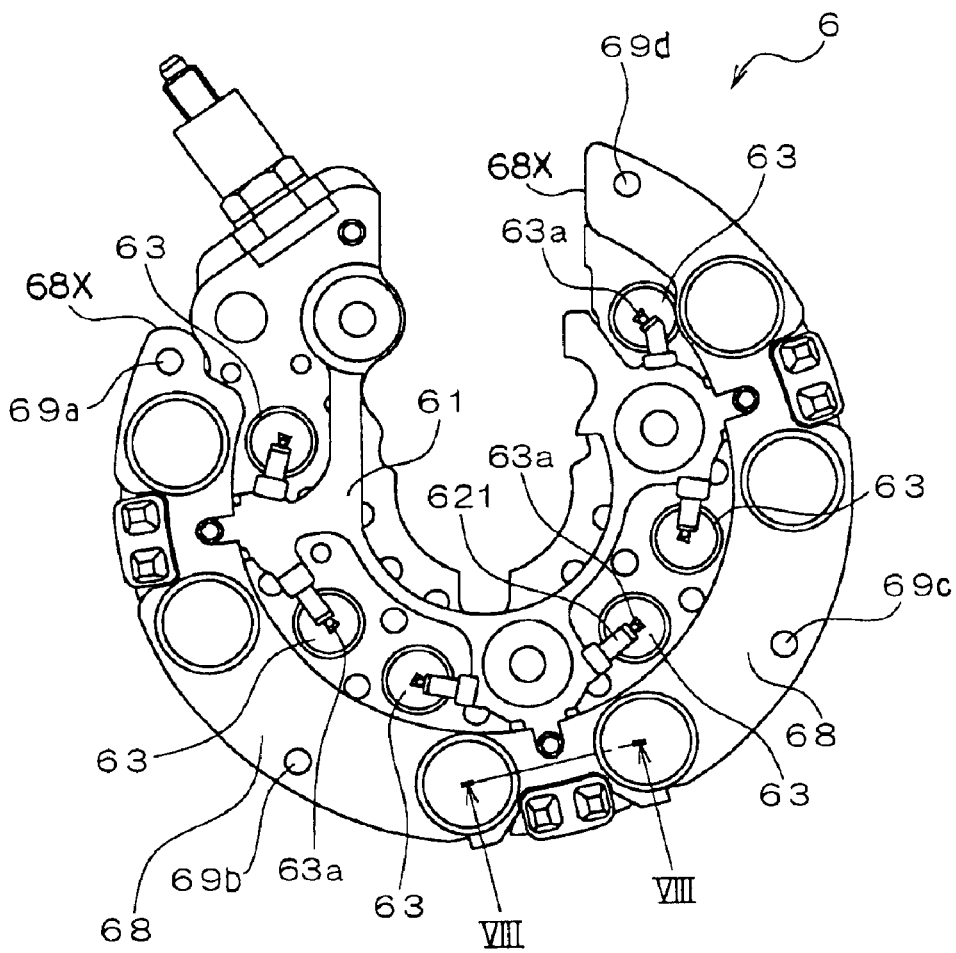
FIG. 7 is a plan view of a rectifying device of a vehicle ac generator according to a third embodiment of the present invention.
Figure 8:
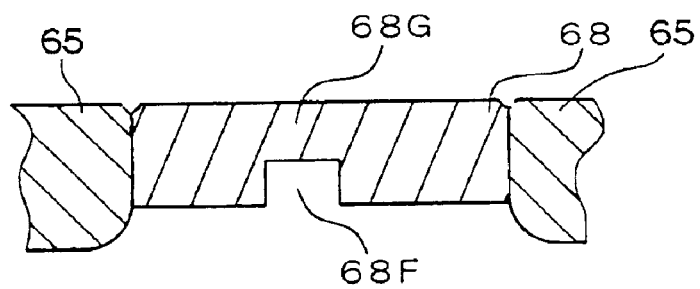
FIG. 8 is an enlarged cross-sectional view of a negative-side radiating fin taken along line VIII—VIII in FIG. 7.

In the third embodiment shown in FIGS. 7 and 8, a groove 68F is provided on the surface of the negative-side radiating fin 68 at a side opposite to the frame 4. The groove 68F is provided at a substantially middle part of the negative-side radiating fin 68 in the circumferential direction and substantially at the lower-most position of the fin 68. A part of the negative-side radiating fin 68 where a thickness is reduced by forming the groove 68F becomes a thin wall portion 68G. Also in this case, advantages similar to the first and the second embodiments are provided.

The present invention is not limited to the above embodiments, but various modifications are available within claimed scope of the present invention. For example, the negative-side radiating fin 68 can have a plurality of grooves between adjacent two of fixing portions. The grooves may be provided near at least one of the fixing portions. Although the rectifying device 6 is fixed to the outside of the frame 4 in the above embodiments, the rectifying device 6 may be fixed to the inside of the frame 4 in a case that the frame 4 entirely covers the rectifying device 6.

Further, the two partial radiating fins 68A and 68B of the negative-side radiating fin 68 have a slightly different shape in the above embodiment. However, the two partial radiating fins 68A and 68B may have an identical shape. In this case, not only a yield rate can be improved, but also the two partial radiating fins 68A and 68B can have an identical part number and be treated as a single part, thereby decreasing the manufacturing cost.

Moreover, the embodiments may be used for a vehicle ac generator in which a positive-side radiating fin of a rectifying device is directly fixed to a frame. In this case, a groove is provided on the positive-side radiating fin.

The present invention should not be limited to the disclosed embodiments, but may be implemented in other ways without departing from the spirit of the invention.

What is claimed is:

1. A vehicle ac generator, comprising:
    a frame;
    a rotor supported in the frame;
    a stator coil fixed to an inside of the frame for generating an ac voltage by rotation of the rotor; and
    a rectifying device for rectifying the ac voltage, the rectifying device having a heat radiating fin in a plate form having a pair of circumferential ends defining a spacing therebetween and a plurality of diodes fitted in the heat radiating fin,
    wherein the heat radiating fin has a plurality of fixing portions to be fixed to the frame and a groove between two of the plurality of fixing portions and at a position generally opposite the spacing between the circumferential ends in the radial direction to ease deformation of the heat radiating fin.

2. The vehicle ac generator according to claim 1, wherein the heat radiating fin is one of a positive-side radiating fin and a negative-side radiating fin.

3. The vehicle ac generator according to claim 1, wherein the rectifying device has a terminal board embedding connecting terminals to connect the plurality of diodes.

4. The vehicle ac generator according to claim 1, wherein the heat radiating fin includes a plurality of partial radiating fins and the groove is defined by separating the plurality of partial radiating fins apart from each other.

5. The vehicle ac generator according to claim 4, wherein the plurality of partial radiating fins has an identical shape.

6. The vehicle ac generator according to claim 1, wherein the groove is provided on a surface of the heat radiating fin at a side facing the frame.

7. The vehicle ac generator according to claim 1, wherein the groove is provided on a surface of the heat radiating fin at a side opposite to the frame.

8. The vehicle ac generator according to claim 1, wherein the heat radiating fin has a plurality of holes to which the plurality of diodes are press-fitted.

9. The vehicle ac generator according to claim 1, wherein the heat radiating fin has a substantially arc shape having a circular arc angle of equal to or larger than 180 degrees, and the groove is provided at a substantially middle part in a circumferential direction of the heat radiating fin.

10. The vehicle ac generator according to claim 1, wherein the heat radiating fin has an arc shape, and the groove is provided at a lower-most position of the fin.

11. The vehicle ac generator according to claim 1, wherein the plurality of fixing portions is provided near a radially outer end of the heat radiating fin.

12. The vehicle ac generator according to claim 4, wherein each of the plurality of the partial radiating fins has at least two fixing portions near a radially outer end.

13. The vehicle ac generator according to claim 1, wherein the plurality of fixing portions defines through holes and the heat radiating fin is directly fixed to the frame with a fixing means fitted in the through holes.

14. The vehicular ac generator according to claim 1, wherein the groove is formed such that it extends in the radial direction from a radially inner edge to a radially outer edge of the heat radiating fin.

15. The vehicular ac generator according to claim 1, wherein the groove is formed such that it is recessed from a plate surface of the heat radiating fin.

16. A vehicular ac generator, comprising:
    a frame;
    a rotor supported in the frame;
    a stator coil fixed to an inside of the frame for generating an ac voltage by rotation of the rotor; and
    a rectifying device for rectifying the ac voltage, the rectifying device is supported by the frame and includes;
    a positive-side heat radiating fin holding positive-side diodes thereon;
    a negative-side heat radiating fin holding negative-side diodes thereon, wherein the negative-side heat radiating fin is fixed to the frame at a plurality of fixing portions and is substantially in a form of plate having a spacing between its circumferential ends and a groove on a side opposite to the spacing in a radial direction, wherein the groove is formed such that it is recessed from the surface of the plate; and
    a terminal board embedding connecting terminals to connect the positive-side diodes and the negative-side diodes, wherein the terminal board interposes the negative-side heat radiating fin between the frame and itself.

17. The vehicular ac generator according to claim 16, wherein the groove extends in a radial direction.

18. The vehicular ac generator according to claim 16, wherein the spacing and the groove are respectively provided between two of the fixing portions.

19. The vehicular ac generator according to claim 16, wherein the groove is formed on a surface of the heat radiating fin which faces the frame.

20. The vehicular ac generator according to claim 16, wherein the groove is provided by separating the negative-side heat radiating fin into at least two pieces and spacing the separated fins in the circumferential direction.

* * * * *